July 16, 1963  A. G. MAKOWSKI  3,097,423
METHOD OF PRODUCING STRESSED JOINT PLASTIC CONTAINERS
Filed Oct. 11, 1960
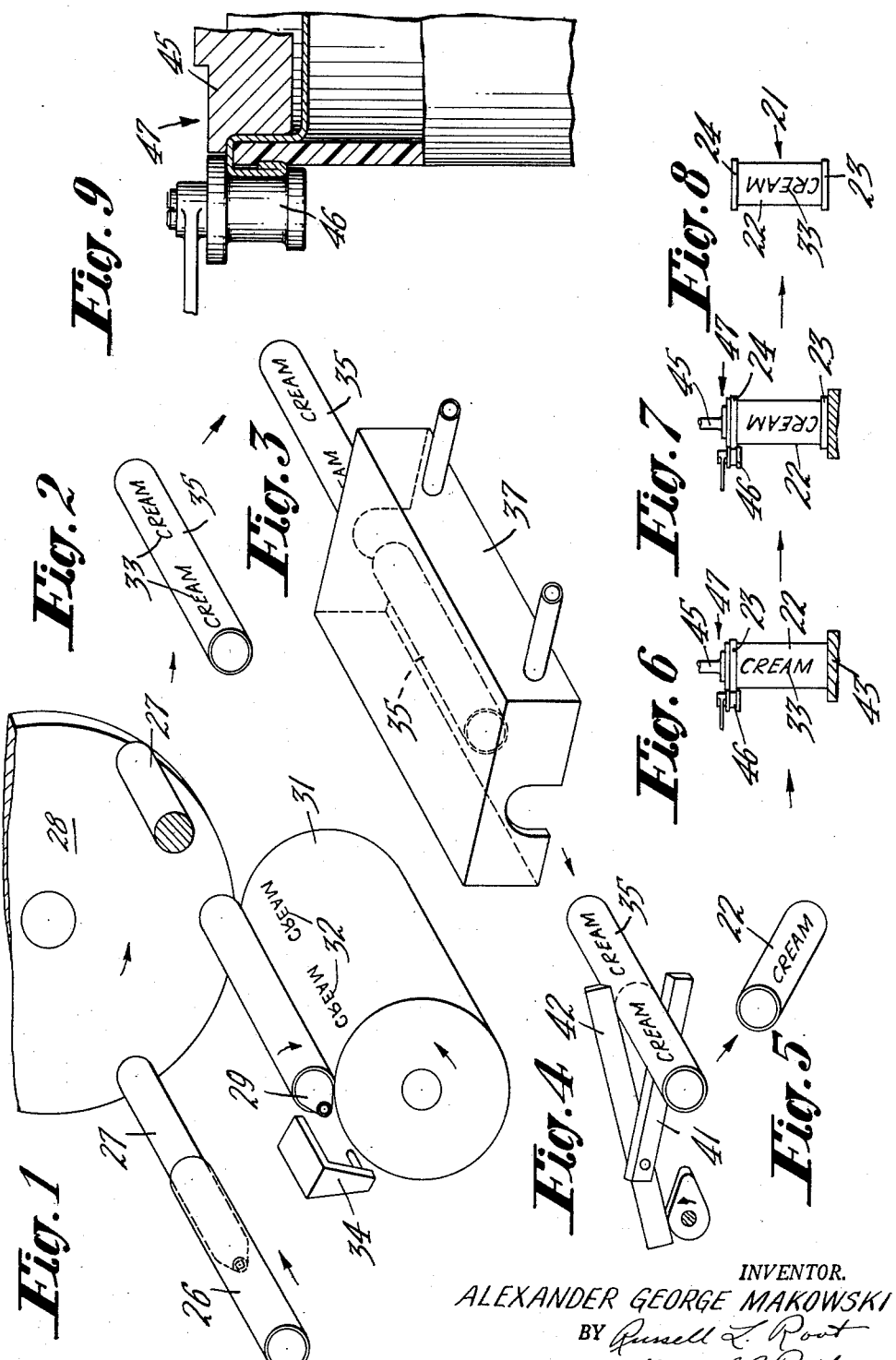
INVENTOR.
ALEXANDER GEORGE MAKOWSKI
BY Russell L. Root
George W. Reiber
ATTORNEYS

United States Patent Office 3,097,423
Patented July 16, 1963

3,097,423
METHOD OF PRODUCING STRESSED JOINT PLASTIC CONTAINERS
Alexander George Makowski, Fayville, Mass., assignor to American Can Company, New York, N.Y., a corporation of New Jersey
Filed Oct. 11, 1960, Ser. No. 61,954
8 Claims. (Cl. 29—407)

The present invention relates to a method of producing tubular plastic containers and has particular reference to a container having a tubular plastic body with one or more of its ends sealed by a body-stressing closure, applied for example by a crimping operation. One particular form of the invention may be visualized in terms of a somewhat resilient plastic body tube with sheet metal end members attached thereto by a seaming operation.

In the manufacture of containers having metal end members seamed to a tube of polyethylene or similar plastic material, as illustrated in U.S. Patent No. 2,753,088, it has been the practice to seam at least one of the sheet metal end members onto each of the tubular bodies prior to any other operations such as printing, coating, etc., because the bodies without the metal ends are flimsy and difficult to handle and the metal ends tend to stiffen the bodies and hold them expanded during handling. The metal ends are also frequently used as handle portions to grip and handle the containers throughout the various subsequent operations.

However, it has now been found that printing and coating the containers which have had an end preinstalled in this customary fashion presents several grave disadvantages. Among these disadvantages is one that stems from the fact that the end member closing the body end makes it necessary to use a cantilever mandrel to support the container body during the usual rotary printing operation. Only one body can be printed at a time and because of the end member the loading end of the mandrel cannot be supported. If printing pressure is sufficient, the mandrel is subject to flexing, being deflected thereby and this may result in a so-called corkscrewing or spiralling of the printing which would mar the overall appearance of the container.

A more important disadvantage, perhaps, is the fact that the printing must be followed by a drying operation. Since this is customarily effected by extended travel through a heated oven the plastic tube body which is sometimes formed by extrusion through a restricted orifice, may shrink and deform in objectionable ways. In particular there has been noted an apparent tendency for the oven heat to affect the integrity of the seam connecting the already attached end member and the plastic body. When the end member is initially seamed in place, there is developed by the squeezing action of the parts of the metal end on the somewhat resilient material of the plastic body, a reactive pressure or stress which serves to hold the joint tight for extended periods. According to the present invention it has been discovered that containers which have had the joint subjected to drying oven heat, usually about 150° F., when placed on a competitive leak test with those containers which have not been heated subsequent to seaming, demonstrate a larger percentage of leakage failures. It is surmised that the heating operation, although not reaching temperatures normally considered as having a softening effect on the plastics involved, permits the plastic to relax somewhat, so that the molecules of the material rearrange themselves, and the original stress built into the joint by the seaming operation is in part dissipated. Whatever the explanation, it is demonstrable that heating the seamed joint after forming contributes noticeably to percentage of leaky containers produced by the process.

It is an object of the present invention to overcome these disadvantages by the provision of a method of producing plastic containers sealed by body-stressing closures in a manner which permits of the effecting of the printing or decorating by rotary printing means and drying operations prior to the placing of either closure on the containers so as to produce properly decorated containers, to enhance their appearance and provide for economical and rapid production, but especially to provide containers whose closure joints have improved reliability.

Another object is the provision of such a method of producing metal end plastic containers wherein a plurality of the bodies may be readily supported on a single mandrel and simultaneously printed or decorated.

Another object is to eliminate corkscrew printing of the container bodies through proper support of the mandrel.

Another object is to devise a process for making decorated containers sealed by body-stressing closures which avoids the tension-altering effect of the ink drying operation upon the body material stress in the joints thereof.

Another object is to provide for the easy transfer and handling of the container bodies during the various operations required to produce the containers.

Numerous other objects and advantages of the invention will be apparent as it is better understood from the following description, which, taken in connection with the accompanying drawings, discloses a preferred embodiment thereof.

Referring to the drawings:

FIGURE 1 is a schematic perspective view illustrating principal parts of one form of apparatus for carrying out a printing step included in the instant method invention;

FIG. 2 is a perspective view of a printed multiple container body as discharged from the apparatus shown in FIG. 1;

FIG. 3 is a schematic perspective view of one form of apparatus for effecting a drying of the printed bodies as one of the steps of the instant method invention;

FIG. 4 is a schematic perspective view of one form of apparatus for dividing a multiple length body into individual bodies;

FIG. 5 is a perspective view of an individual body as it is conveyed to a subsequent operation station;

FIG. 6 is a schematic elevational view of one form of apparatus for seaming a sheet metal end member on one end of an individual body;

FIG. 7 is a view similar to FIG. 6 but illustrating the seaming of the second sheet metal end on the individual body;

FIG. 8 is an elevational view of a finished container produced by the steps of the instant method invention; and FIG. 9 is a fragmentary elevation, partly in section, to a larger scale, illustrating in detail the operation shown in FIG. 6.

As a preferred and exemplary embodiment of the instant method invention, the drawings illustrate schematically the various steps involved in producing a metal end plastic container 21 (FIG. 8) made of polyethylene or similar material and comprising an exteriorly printed or decorated tubular plastic body 22 and sheet metal end members 23 and 24 seamed thereto, one of which may be apertured for reception of a closure if desired.

In producing such a container 21, its body 22 is first formed by extruding a long flexible plastic tube of predetermined finish diameter having accurately uniform wall thickness about its circumference, and then cutting the tube into lengths 26 (FIG. 1) to facilitate handling. In accordance with the instant method invention, the tube may be cut into single body lengths or multiple body lengths if desired. By way of example, the multiple body length is selected for discussion in this specification, the cut off length 26 of the tube containing two bodies, although more than two may be contained in the cut-off length if desired.

The cut off tube 26 is placed on a cantilever mandrel 27 (FIG. 1) preferably mounted on a rotatable disc 28. Since the body tube 26 is open at both ends it is readily pushed into place on the mandrel so that the entire length is supported on the mandrel. This permits of printing or decorating all the way to the outer edges of the tube.

In the case of prior procedures the mandrel had to be quite blunt in order to project well up into the head end of the container and support as much as possible of the length of the body wall for printing. This made loading of the mandrel, whether by hand or machine, quite difficult and erratic. According to the present invention a cone shaped nose 29 having an extended taper can be provided on the outer end of the mandrel to facilitate telescoping of the tube over the mandrel.

With the tube 26 fully supported on the mandrel 27, the disc 28 is rotated to carry the supported tube 26 into engagement with a rotatable printing or decorating roller 31 which during rotation applies, by means of type or other imaging agents 32, a fluid substance such as ink in a printed design or other decoration 33, in this case in duplicate, onto the exterior surface of the body tube 26. Since the outer or nose end of the mandrel 27 is free during this printing operation, it is readily supported in a movable holder 34 engageable with the nose 29 of the mandrel. The holder 34 provides a rigid support for the mandrel 27 and thereby prevents its being deflected during the printing operation. This insures proper printing and overcomes any tendency to produce a corkscrew pattern as hereinbefore referred to.

Upon completion of the printing operation, the tube, formerly designated as 26, is stripped off the mandrel 27 as a fully printed or decorated double body tube 35 (FIG. 2) and is immediately conveyed by any suitable means to and through a conventional drying or heat treating oven 37 (FIG. 3). Passage of the printed body tube 35 through this oven, usually at a temperature of about 150° F., dries the ink or other decorative film on the body tube to facilitate further handling.

Upon discharge from the oven 37, the printed and dried double body tube 35, is divided into the individual bodies 22. This division of the body tube 35 preferably is effected by cutting the body tube into two equal parts to produce the container bodies 22. This preferably is effected by a cutting device, one form of which comprises a pair of cut-off shears 41, 42 as shown in FIG. 4.

Upon division of the body tube 35, into individual bodies 22, the bodies 22 individually, preferably are conveyed to a seaming station such as that illustrated in FIG. 6.

At the seaming station one end of the body is mounted on the lifter, a disk-shaped sheet metal end member 23 is placed thereon, and the body 22, pad 43 of the seamer and end member 23 are simultaneously raised into operative relation to a chuck 45 and a seaming roll 46 of a conventional seaming head 47. After operation of the seaming head 47 in the usual manner, the end member 23 is clinched to the end margin of the plastic body and places the material thereof in a stressed condition which serves to keep the joint tight and free from leakage. This operation is illustrated in greater detail in FIG. 9.

A second seaming operation is then performed either at the same station or another station by inverting the container body 22, placing another sheet metal end member 24 against the now upper end of the body, then raising the assembly via the lifter 43 into operative relation to the seaming head 47, and thereby clinching the second sheet metal end member 24 into tight engagement with end margin of the body 22. This operation is illustrated in FIG. 7, to which the detail features of FIG. 9 would be, of course, equally applicable.

After seaming on of the head 24 is completed in the above described manner, the container is discharged as a finished, fully printed or decorated container 21, as shown in FIG. 8. The container has end joints which retain the full value of the plastic stress introduced by the seaming operation, unaffected by any subsequent heating treatment, and thus are capable of maintaining reliable seals at the end joints for extended periods.

While the foregoing description of the sealing operation, for purposes of illustration, has proceeded on the basis of seaming two sheet metal end members onto the ends of a plastic tube, it will be understood that the principles set forth will apply equally to any container situation embodying the forcible connection of a closure element to a resilient plastic body member where the sealing is brought about by the stressing action of the closure element upon the material of the body. In particular the invention is not confined to the use of two sheet metal end members, but may also relate to a container where only one sheet metal end member is attached by seaming and the other end of the plastic body is closed in some other fashion, or is left open to be closed by a seaming operation after filling.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof. In particular, while it is presently preferred to separate the multiple container bodies by cutting after the drying step, it will be understood that this separation could take place if desired by cutting against the mandrels 27 at a station following the printing station.

I claim:

1. A method of producing containers comprising the steps of providing tubular container bodies of resilient plastic material open at both of the opposite ends thereof, prior to closing either of said ends of said bodies decorating the exterior surfaces of said bodies by applying a coating thereto, heat treating said open-ended decorated container bodies to dry said coating, and thereafter closing both of said opposite ends of said body by attaching stress-applying closure elements thereto.

2. A method of producing containers comprising the steps of providing tubular container bodies of resilient plastic material open at both of the opposite ends thereof, prior to closing either of said ends of said bodies decorating the exterior surfaces of said bodies by applying a coating thereto, heat treating said open-ended decorated container bodies to dry said coating, and thereafter closing both of said opposite ends of said body by crimping sheet metal closure elements thereto in stress-applying relation to the material of said body.

3. A method of producing containers comprising the steps of providing tubular container bodies of resilient plastic material open at both of the opposite ends thereof, prior to closing either of said ends of said bodies decorating the exterior surfaces of said bodies by applying a coating thereto, heat treating said open-ended decorated container bodies to dry said coating, and thereafter closing both of said opposite ends of said body by seaming disk shaped sheet metal end members to the end margins of the tube.

4. A method of producing a plastic container comprising the steps of providing a tubular unheaded container body of resilient plastic open at both ends, supporting the body for its full length on a mandrel, printing said body while on said mandrel, supporting opposite ends of said mandrel against flexure to insure against corkscrewing of said printing, discharging said open-ended printed body from said mandrel, heat treating said container body to dry the printing thereon, and thereafter closing both of the open ends of the body by attaching stress-applying closure elements thereto.

5. A method of producing plastic containers comprising the steps of providing a resilient plastic body tube of a length containing a plurality of container bodies open at both of the opposite ends thereof, printing the exterior surfaces of said open-ended body tube, heating said open-ended printed body tube to dry the same, dividing said printed and dried body tube into a plurality of individual open-ended container bodies, and thereafter closing both of the opposite ends of each individual container body by attaching stress-applying closure elements thereto.

6. A method of producing a decorated thermoplastic container embodying a reliable leak-proof joint formed by crimping stress-applying members to both of the opposite ends of the plastic material which comprises forming a finish diameter tube of constant wall thickness open at both ends from a resilient thermoplastic material capable of producing a tight seal by local stress application but subject to relaxing effects when heated at moderate temperatures insufficient to soften the same, placing the open-ended tube on a smooth, snugly fitting rotatable mandrel, decorating the open-ended tube by a rotary printing process wherein the mandrel backs up the tube during printing and is thus conducive to uniform imprints of high quality, removing the open-ended tube from the mandrel and passing it through a drying zone to set the imprint at elevated temperature normally sufficient to cause said relaxing effect, and thereafter closing both of the opposite ends of the tube by firmly crimping thereon stress-applying members in tube-closing relation, whereby the completed decorated container has a reliable joint capable of remaining tight by reason of the inherent resilience of the plastic in the absence of subsequent heating treatment.

7. A method of producing a plurality of decorated thermoplastic containers embodying a reliable leak-proof joint formed by crimping stress-applying members to both of the opposite ends of the plastic material which comprises forming a finish diameter tube of constant wall thickness open at both ends from a resilient thermoplastic material capable of producing a tight seal by local stress application but subject to relaxing effects when heated at moderate temperatures insufficient to soften the same, placing the open-ended tube on a smooth, snugly fitting rotatable mandrel, decorating the open-ended tube with markings indicative of a plurality of open-ended body lengths by a rotary printing process wherein the mandrel backs up the tube during printing and is thus conducive to uniform imprints of high quality, removing the open-ended tube from the mandrel and passing it through a drying zone to set the imprint at elevated temperature normally sufficient to cause said relaxing effect, cutting the tube into body-length open-ended tubes, and thereafter closing both of the opposite ends of each body-length tube by firmly crimping thereon stress-applying members in tube-closing relation, whereby the completed decorated container has a reliable joint capable of remaining tight by reason of the inherent resilience of the plastic in the absence of subsequent heating treatment.

8. A method as claimed in claim 6 wherein there is also included the step of supporting the said rotatable mandrels at both ends during said rotary printing to insure uniform pressure and avoid distortion and deflection of the mandrel with consequent tube displacement due to printing pressures.

References Cited in the file of this patent

UNITED STATES PATENTS

| | | |
|---|---|---|
| 1,959,978 | Freund | May 22, 1934 |
| 2,121,022 | Cornwell | June 21, 1938 |
| 2,141,722 | Morgan | Dec. 27, 1938 |
| 2,188,912 | Martina | Feb. 6, 1940 |
| 2,753,088 | Prahl | July 3, 1956 |